United States Patent
Kusuda

(10) Patent No.: US 8,072,527 B2
(45) Date of Patent: Dec. 6, 2011

(54) SOLID STATE IMAGE SENSING DEVICE

(75) Inventor: Masayuki Kusuda, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 359 days.

(21) Appl. No.: 12/486,871

(22) Filed: Jun. 18, 2009

(65) Prior Publication Data
US 2009/0316034 A1 Dec. 24, 2009

(30) Foreign Application Priority Data
Jun. 23, 2008 (JP) ................................. 2008-163007

(51) Int. Cl.
*H04N 5/335* (2011.01)

(52) U.S. Cl. ........ 348/308; 348/300; 341/118; 341/155; 341/172

(58) Field of Classification Search .................. 348/294, 348/300, 301, 308; 341/118–122, 155–172
See application file for complete search history.

(56) References Cited

U.S. PATENT DOCUMENTS

| | | | | |
|---|---|---|---|---|
| 2006/0158541 A1* | 7/2006 | Ichikawa | ....................... | 348/308 |
| 2006/0187329 A1* | 8/2006 | Panicacci | ....................... | 348/308 |
| 2007/0024730 A1* | 2/2007 | Muramatsu et al. | .......... | 348/308 |
| 2008/0129851 A1* | 6/2008 | Kasuga et al. | ................ | 348/294 |
| 2009/0195680 A1* | 8/2009 | Krymski | ....................... | 348/300 |
| 2009/0213258 A1* | 8/2009 | Fowler | ......................... | 348/308 |
| 2009/0244328 A1* | 10/2009 | Yamashita | .................... | 348/241 |

FOREIGN PATENT DOCUMENTS

JP 2002-232291 A 8/2002

* cited by examiner

*Primary Examiner* — Tuan Ho
*Assistant Examiner* — Kent Wang
(74) *Attorney, Agent, or Firm* — Sidley Austin LLP

(57) ABSTRACT

A column A/D converter includes two column A/D converting elements. Each of the column A/D converting elements is operable to divide a pixel signal read out from a pixel array into two blocks i.e. an upper block constituted of upper two bit data, and a lower block constituted of lower two bit data, and sequentially perform A/D conversion with respect to the blocks in the unit of one horizontal scanning period. A controller causes each of the column A/D converting elements to concurrently perform A/D conversion with respect to different blocks of pixel signals at different rows.

8 Claims, 11 Drawing Sheets

SOLID STATE IMAGE SENSING DEVICE

This application is based on Japanese Patent Application No. 2008-163007 filed on Jun. 23, 2008, the contents of which are hereby incorporated by reference.

BACKGROUND OF THE INVENTION AND RELATED ART STATEMENT

1. Field of the Invention

The present invention relates to a solid state image sensing device provided with a column AD converter.

2. Description of the Related Art

In recent years, a solid state image sensing device incorporated with a CMOS (Complementary Metal Oxide Semiconductor) image sensor provided with a column A/D converter has been widely spread. For instance, there is known a solid state image sensing device including a pixel array constituted of pixels arranged in a matrix of a predetermined number of rows and a predetermined number of columns; and column A/D converting circuits corresponding to the columns of the pixel array, and for reading out a pixel signal from the pixel array for A/D conversion. Each of the column A/D converting circuits is a double integral A/D converting circuit for dividing the pixel signal into two blocks, and performing A/D conversion with respect to the blocks (see Japanese Unexamined Patent Publication No. 2002-232291).

FIG. 9 is a circuit diagram showing a column A/D converting circuit, corresponding to one column, to be used in a conventional solid state image sensing device. The column A/D converting circuit shown in FIG. 9 is a single slope integration column A/D converting circuit, and includes, in the order of input of a pixel signal from a pixel array, a GCA (Gain Control Amplifier) section 100, a comparator section 200, a logic circuit 300, a latch section 400, and a switch section 500.

The GCA section 100 is operable to amplify a pixel signal outputted from the pixel array, while performing CDS (Correlated Double Sampling) to remove a noise signal from the pixel signal.

The comparator section 200 has two comparators provided stepwise, and is operable to compare a pixel signal outputted from the GCA section 100 with two ramp signals (hereinafter, called as ramp signals Ramp1 and Ramp2). The ramp signal Ramp1 stepwise decreases in four steps, as time elapses, and the ramp signal Ramp2 stepwise increases in four steps, as time elapses.

The comparator section 200 compares the pixel signal outputted from the GCA section 100, with the ramp signal Ramp1 for A/D conversion with respect to upper two bits of the pixel signal; and inverts the output signal, if the level of the ramp signal Ramp1 is under the level of the pixel signal. After the comparison between the ramp signal Ramp1 and the pixel signal is terminated, the comparator section 200 compares the pixel signal outputted from the GCA section 100, with the ramp signal Ramp2 for A/D conversion with respect to lower two bits of the pixel signal; and inverts the output signal, if the level of the ramp signal Ramp2 is over the level of the pixel signal.

In response to inversion of the output signal by the comparator section 200, as a result of comparison between the pixel signal and the ramp signal Ramp1, the logic circuit 300 sets a signal COMPOUT1 to COMPOUT1=L (low level), and outputs the signal to a latch circuit 410. In response to inversion of the output signal by the comparator section 200, as a result of comparison between the pixel signal and the ramp signal Ramp2, the logic circuit 300 sets a signal COMPOUT2 to COMPOUT2=L, and outputs the signal to a latch circuit 420.

A counter 710 is constituted of a two-bit counter provided at the exterior of the column A/D converting circuit, and starts a counting operation in response to input of the ramp signal Ramp1 to the comparator section 200. Likewise, a counter 720 is constituted of a two-bit counter provided at the exterior of the column A/D converting circuit, and starts a counting operation in response to input of the ramp signal Ramp2 to the comparator section 200.

The latch section 400 includes the latch circuit 410 and the latch circuit 420. The latch circuit 410 latches a currently counted value of the counter 710, when COMPOUT1=L. Thereby, the latch circuit 410 latches digital data of upper two bits of the A/D converted pixel signal.

Likewise, the latch circuit 420 latches a currently counted value of the counter 720, when COMPOUT2=L. Thereby, the latch circuit 420 latches digital data of lower two bits of the A/D converted pixel signal.

A horizontal scanning circuit 600 outputs a column selecting signal indicating a column to be sequentially selected to switches 510 and 520, upon completion of A/D conversion with respect to the upper two bits of the pixel signal and the lower two bits of the pixel signal, turns on the switches 510 and 520, and outputs the digital data of upper two bits latched by the latch circuit 410, and the digital data of lower two bits latched by the latch circuit 420 to a horizontal signal line.

FIG. 10 is a timing chart of the column A/D converting circuit shown in FIG. 9. The timing chart shows operations to be performed with respect to a pixel signal at the i-th row of a pixel array in one horizontal scanning period.

Referring to FIG. 10, the symbol Vpixel indicates a pixel signal to be inputted to the GCA section 100, φPRST indicates a signal for turning on and off a switch of the GCA section 100, φS1 indicates a signal for turning on and off a switch of the former comparator in the comparator section 200, φS2 indicates a signal for turning on and off a switch of the latter comparator in the comparator section 200, φSH indicates a signal for turning on and off a switch connected between the GCA section 100 and the comparator section 200, φCK1 indicates a signal to be inputted to the upper NAND gate in the logic circuit 300, φCK2 indicates a signal to be inputted to the lower NAND gate in the logic circuit 300, Counter 1 indicates a counted value of the counter 710, Counter 2 indicates a counted value of the counter 720, Horizontal Shift Register Start Pulse indicates a horizontal synchronizing signal representing start of one horizontal scanning period, and DATAOUT indicates digital data to be outputted from the latch circuits 410 and 420.

As shown in FIG. 10, in one horizontal scanning period, the following operations (1) through (3) are performed, and the following operation (4) is performed concurrently with the operations (1) through (3).

Operation (1): Pixel readout (i-th row) An operation of reading out a pixel signal at the i-th row, while performing CDS to remove a noise signal from the pixel signal.

Operation (2): Upper bit A/D conversion (i-th row) An operation of performing A/D conversion with respect to upper two bits of the pixel signal at the i-th row.

Operation (3): Lower bit A/D conversion (i-th row) An operation of performing A/D conversion with respect to lower two bits of the pixel signal at the i-th row.

Operation (4): Output ((i−1)-th row) An operation of outputting the A/D converted pixel signal at the (i−1)-th row.

As shown in FIG. 9, the latch section 400 has a two-step arrangement constituted of the latch circuit 410 and the latch circuit 420. Accordingly, the operations (1) through (3), and the operation (4) can be concurrently performed. Specifically, digital data of the pixel signal at the (i−1)-th row can be outputted, while performing A/D conversion with respect to the pixel signal at the i-th row.

If the level of the ramp signal Ramp1 is under the level of the pixel signal at a timing TM1 in the period of the operation (2), COMPOUT1=L. Since the counted value of the Counter 1 when COMPOUT1=L is "01", the latch circuit 410 latches "01".

If the level of the ramp signal Ramp2 is over the level of the pixel signal at a timing TM2 in the period of the operation (3), COMPOUT2=L. Since the counted value of the Counter 2 when COMPOUT2=L is "10", the latch circuit 420 latches "10".

Then, in a succeeding horizontal scanning period, "01" latched by the latch circuit 410, and "10" latched by the latch circuit 420 are outputted to the horizontal signal line.

As described above, the double integral A/D converting circuit having the above arrangement enables to perform A/D conversion with a less number of clocks. Accordingly, as compared with a single integral A/D converting circuit, a time required for A/D conversion can be reduced, and one horizontal scanning period can be reduced. Thereby, the frame rate can be increased, and a high-speed photographing operation can be performed.

FIG. 11 is a sequence diagram on pixel signals at the i-th row and the (i+1)-th row to be processed by the A/D converting circuit shown in FIG. 9. The operations (1) through (3) are performed in one horizontal scanning period for the first row, wherein the pixel signal at the i-th row is subjected to A/D conversion, and the A/D converted digital data is latched by the latch circuits 410 and 420.

Then, in one horizontal scanning period for the second row, the operations (1) through (3) are performed, wherein the pixel signal at the (i+1)-th row is subjected to A/D conversion, and the A/D converted digital data is latched by the latch circuits 410 and 420; and the operation (4) is also performed, wherein the digital data of the i-th row latched by the latch circuits 410 and 420 is outputted from the latch circuits 410 and 420.

Then, in one horizontal scanning period for the third row, the operation (4) is performed, wherein the digital data of the (i+1)-th row latched by the latch circuits 410 and 420 is outputted from the latch circuits 410 and 420.

Specifically, in each of the one horizontal scanning periods, A/D conversion of the pixel signal at the (i+1)-th row, and output of the pixel signal at the i-th row are concurrently performed.

In the case where a pixel signal is divided into data of upper two bits and data of lower two bits for A/D conversion, as implemented by the A/D converting circuit shown in FIG. 9, the computation result on digital data of upper two bits is important. A/D conversion with respect to data of upper two bits is performed based on a comparison result between the ramp signal Ramp1 and the pixel signal. However, a certain time is required until the ramp signal Ramp1 is completely settled. In view of this, it is necessary to secure a predetermined time as a period for A/D conversion with respect to data of upper two bits in order to perform high-precision A/D conversion with respect to data of upper two bits.

As shown in FIG. 11, the operations (1) through (3) are performed in one horizontal scanning period by the A/D converting circuit shown in FIG. 9. It is, however, difficult to reduce the time required for performing the operation (2) of performing A/D conversion with respect to data of upper two bits. Accordingly, in the above arrangement, it is impossible to reduce one horizontal scanning period, and increase the frame rate.

SUMMARY OF THE INVENTION

In view of the above, it is an object of the present invention to provide a solid state image sensing device that enables to reduce one horizontal scanning period so as to increase the frame rate, and also perform high-precision A/D conversion.

A solid state image sensing device according to an aspect of the invention includes: a pixel array constituted of pixels arranged in a matrix of a predetermined number of rows and a predetermined number of columns; a vertical scanning circuit for cyclically selecting a row out of the rows of the pixel array; column A/D converters provided in correspondence to the columns of the pixel array, and for reading out a pixel signal of the row selected by the vertical scanning circuit for A/D conversion, each of the column A/D converters including first through n-th column A/D converting elements, where n is an integer of 2 or more; and a controller for controlling the pixel array, the vertical scanning circuit, and the first through the n-th column A/D converting elements to cause each of the first through the n-th column A/D converting elements to divide the pixel signal read out from the pixel array into first through n-th blocks from an uppermost bit to a lowermost bit, and sequentially perform A/D conversion with respect to the blocks in the unit of one horizontal scanning period in such a manner that concurrent A/D conversion with respect to different blocks of pixel signals at different rows is performed.

These and other objects, features and advantages of the present invention will become more apparent upon reading the following detailed description along with the accompanying drawings.

DETAILED DESCRIPTION OF THE PREFERRED EMBODIMENTS OF THE INVENTION

The invention is now described, by way of example, with reference to the accompanying drawings.

First Embodiment

Figure 1:
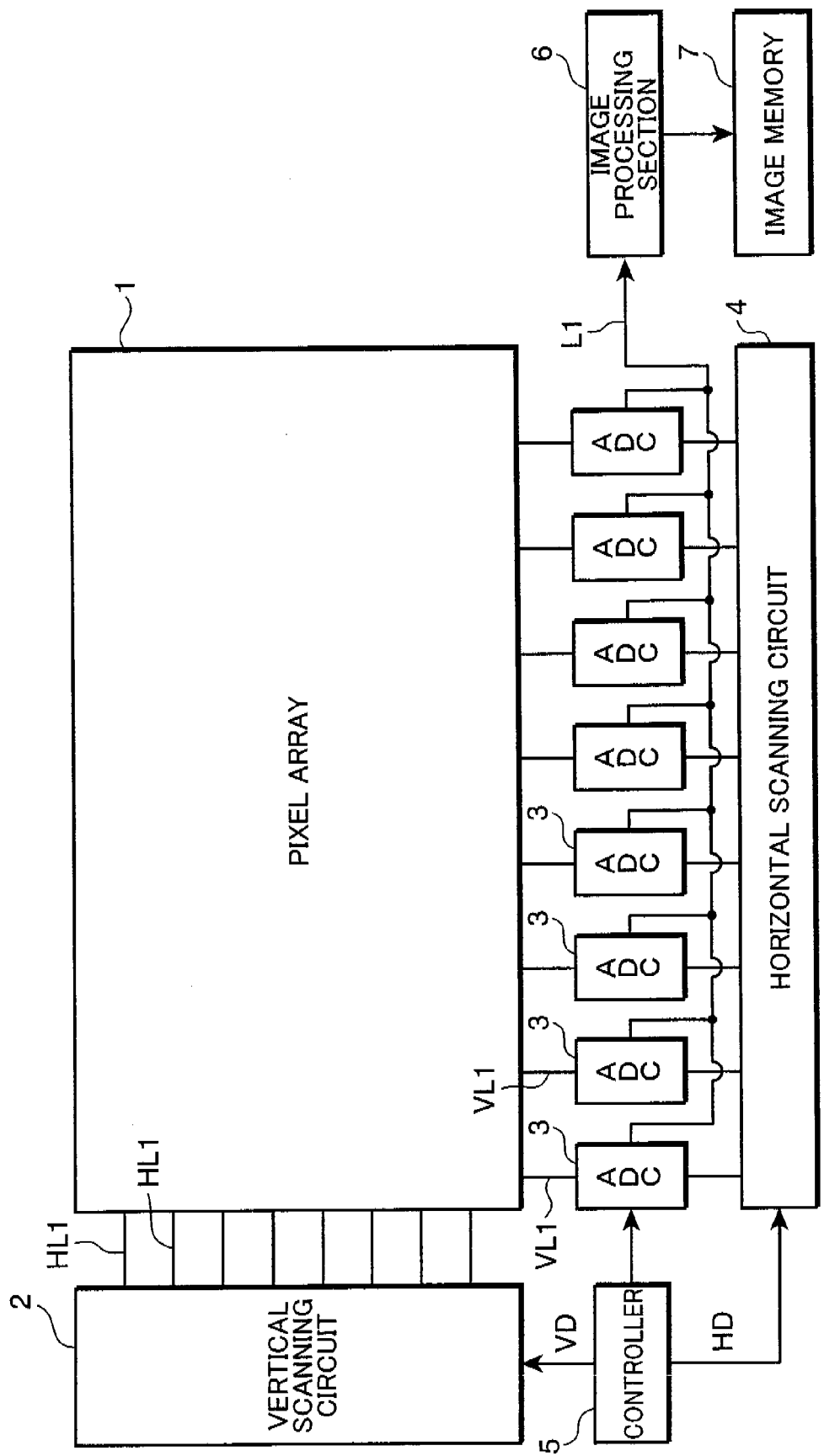
FIG. 1 is a diagram schematically showing the entire arrangement of a solid state image sensing device in accordance with the first embodiment of the invention.

FIG. 1 is a diagram schematically showing the entire arrangement of a solid state image sensing device in accordance with the first embodiment of the invention. As shown in FIG. 1, the solid state image sensing device is a solid state image sensing device incorporated with a CMOS image sensor provided with a column A/D converter; and includes a pixel array 1, a vertical scanning circuit 2, column A/D converters (or ADC) 3, a horizontal scanning circuit 4, a controller 5, an image processing section 6, and an image memory 7.

The pixel array 1 is constituted of multiple pixels arranged in a matrix of eight rows and eight columns. The pixel array 1 constituted of pixels arranged in eight rows and eight columns is merely an example, and may be constituted of pixels arranged in M (where M is an integer of 2 or more) rows and N (where N is an integer of 2 or more) columns.

The vertical scanning circuit 2 includes e.g. a shift register, and is connected to the pixel array 1 via eight pixel control lines HL1 corresponding to the first through the eighth rows of the pixel array 1. The vertical scanning circuit 2 is operable to vertically scan the pixel array 1 by cyclically selecting one of the pixel control lines HL1 corresponding to the first through the eighth rows of the pixel array 1 in synchronism with a vertical synchronizing signal VD.

Eight column A/D converters 3 are provided in correspondence to the columns of the pixel array 1. The column A/D converters 3 are connected to the pixel array 1 respectively via eight vertical signal lines VL1 corresponding to the first through the eighth columns of the pixel array 1. Each of the column A/D converters 3 is operable to read out a pixel signal from a corresponding pixel column, at a row selected by a vertical scanning operation of the vertical scanning circuit 2; and perform CDS (Correlated Double Sampling) and A/D (analog-to-digital) conversion with respect to the readout pixel signal.

Figure 2:
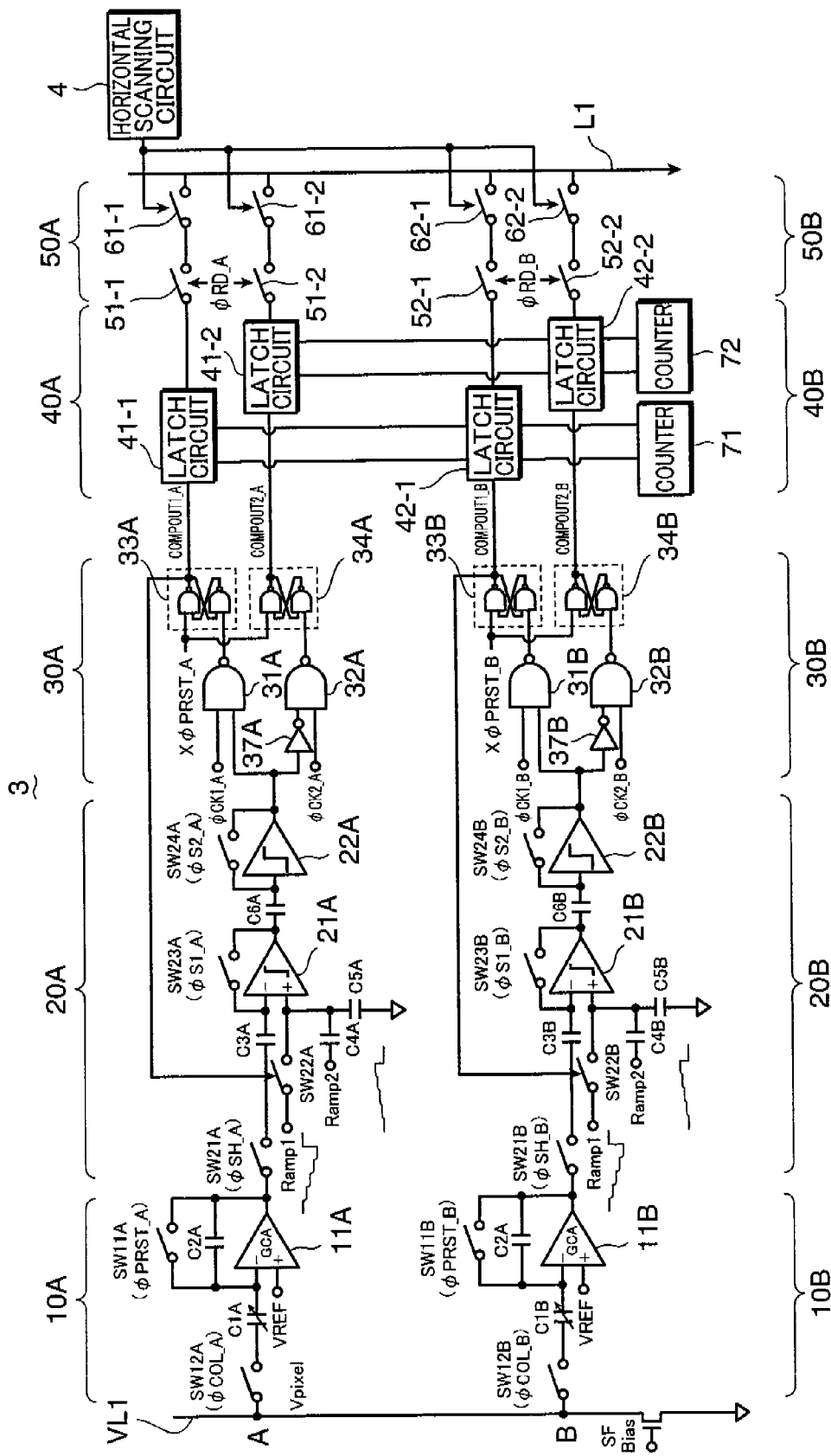
FIG. 2 is a circuit diagram of a column A/D converter shown in FIG. 1.

In this embodiment, as shown in FIG. 2, the column A/D converter 3 is constituted of a column A/D converting element "A" and a column A/D converting element "B". Each of the column A/D converting elements "A" and "B" is constituted of a double integral A/D converting circuit operable to divide a pixel signal into two blocks from an uppermost bit to a lowermost bit, and sequentially perform A/D conversion with respect to the blocks in the unit of one horizontal scanning period.

The horizontal scanning circuit 4 includes a shift register, and is operable to output a column selecting signal to the corresponding column AD converter 3 in synchronism with a horizontal synchronizing signal HD. Thereby, the horizontal scanning circuit 4 cyclically selects one of the column A/D converters 3 corresponding to the first through the eighth columns of the pixel array 1 to horizontally scan the column A/D converters 3, and causes the column A/D converters 3 to sequentially output pixel signals of the first through the eighth columns held in the column A/D converters 3 in one horizontal scanning period.

The controller 5 is constituted of a microcomputer including a CPU (Central Processing Unit), an ROM (Read Only Memory), and an RAM (Random Access Memory), and controls overall operations of the solid state image sensing device.

The controller 5 controls the pixel array 1, the vertical scanning circuit 2, and the horizontal scanning circuit 4 to cause each of the column A/D converting elements "A" and "B" to divide the pixel signal read out from the pixel array 1 into two blocks from the uppermost bit to the lowermost bit, and sequentially perform A/D conversion with respect to the blocks in the unit of one horizontal scanning period in such a manner that A/D conversion with respect to different blocks of pixel signals at different rows is concurrently performed.

The controller 5 causes the column A/D converting element j (j=A, B) in each of the column A/D converters 3 to read out a pixel signal at the i-th row (i=1 through 8), and then perform A/D conversion with respect to the upper block of the pixel signal at the i-th row; and also causes the column A/D converting element k (k≠j, and k=A, B) to perform A/D conversion with respect to the lower block of the pixel signal at the (i−1)-th row in one horizontal scanning period.

Further, the controller 5 causes the column A/D converting element j in each of the column A/D converters 3 to simultaneously read out the pixel signal at the i-th row, and output digital data of the pixel signal at the (i−2)-th row.

The image processing section 6 is operable to perform various image processing operations with respect to image data constituted of digital data outputted from the column A/D converters 3. The image memory 7 is constituted of a storage such as a hard disk, and is operable to store image data subjected to a predetermined image processing operation by the image processing section 6.

FIG. 2 is a circuit diagram of the column A/D converter 3. Referring to FIG. 2, φCOL_A, φPRST_A, φSH_A, φS1_A, φS2_A, φCK1_A, φCK2_A, XφPRST_A, and φRD_A in the column A/D converting element "A" each indicates a control signal, and are respectively outputted from the controller 5.

Likewise, φCOL_B, φPRST_B, φSH_B, φS1_B, φS2_B, φCK1_B, φCK2_B, XφPRST_B, and φRD_B in the column A/D converting element "B" each indicates a control signal, and are respectively outputted from the controller 5. The indications Ramp1 and Ramp2 each indicates a ramp signal, and are respectively outputted from the controller 5.

The column A/D converting element "A" includes a GCA (Gain Control Amplifier) section 10A, a comparator section 20A, a logic circuit 30A, a latch section 40A, and a switch section 50A.

The GCA section 10A is operable to amplify a pixel signal outputted from the pixel array 1, while performing CDS to remove a noise signal from the pixel signal.

Specifically, the GCA section 10A includes a GCA amplifier 11A, a capacitor C1A connected to a minus terminal of the GCA amplifier 11A, a capacitor C2A connected between an output terminal of the GCA amplifier 11A and the minus terminal of the GCA amplifier 11A, a switch SW11A parallel-connected to the capacitor C2A, and a switch SW12A connected between the capacitor C2A and the vertical signal line VL1.

A pixel signal is amplified by a gain to be determined based on a capacitance ratio between the capacitors C1A and C2A. The capacitor C2A is reset by turning on and off the switch SW11A. The switches SW12A and SW11A are respectively turned on and off by the control signals φCOL_A and φPRST_A.

The comparator section 20A is constituted of a comparator 21A and a comparator 22A provided in two steps, and is operable to compare a pixel signal outputted from the GCA section 10A with the ramp signals Ramp1 and Ramp2. In this embodiment, a pixel signal is divided into two blocks i.e. an upper block constituted of upper two bit data, and a lower block constituted of lower two bit data for A/D conversion.

In view of the above, a ramp signal which stepwise decreases in four (=$2^2$) steps is used as the ramp signal Ramp1 for performing A/D conversion with respect to the upper block, and a ramp signal which stepwise increases in four (=$2^2$) steps is used as the ramp signal Ramp2 for performing A/D conversion with respect to the lower block.

The comparator section 20A is operable to compare a pixel signal outputted from the GCA section 10A with the ramp signal Ramp1 to perform A/D conversion with respect to the upper block of the pixel signal; and invert the output signal, if the level of the ramp signal Ramp1 is under the level of the pixel signal.

Upon completion of the comparison between the ramp signal Ramp1 and the pixel signal, the comparator section 20A is operable to compare the pixel signal outputted from the GCA section 10A with the ramp signal Ramp2 to perform A/D conversion with respect to the lower block of the pixel signal; and invert the output signal, if the level of the ramp signal Ramp2 is over the level of the pixel signal.

Specifically, the comparator section 20A includes a capacitor C3A connected to a minus terminal of the comparator 21A, a switch SW21A connected between the capacitor C3A and the GCA amplifier 11A, a switch SW22A connected to a plus terminal of the comparator 21A, a capacitor C4A connected to the plus terminal of the comparator 21A, and for inputting the ramp signal Ramp2, a capacitor C5A having a terminal connected to the plus terminal of the comparator 21A and the other terminal connected to the ground, a switch SW23A connected between the minus terminal and an output terminal of the comparator 21A, a capacitor C6A connected between the comparator 21A and the comparator 22A, and a switch SW24A connected between an input terminal and an output terminal of the comparator 22A.

The comparator 21A is constituted of a differential comparator, and is operable to compare the ramp signal Ramp1 or Ramp2 to be inputted to the plus terminal, with the pixel signal. The comparator 22A is constituted of a single end comparator, and is operable to compare the output signal from the comparator 21A with a predetermined value.

The switches SW21A, SW23A, and SW24A are respectively turned on and off in accordance with the control signals φSH_A, φS1_A, and φS2_A. The switch SW22A is turned on and off in accordance with a signal COMPOUT1_A to be outputted from the logic circuit 30A.

The logic circuit 30A sets the signal COMPOUT1_A to COMPOUT1_A=L, if the output signal from the comparator section 20A is inverted as a result of comparison between the pixel signal and the ramp signal Ramp1; and causes a latch circuit 41-1 to latch a currently counted value of a counter 71. Thereby, digital data of the upper block is obtained.

The logic circuit 30A sets a signal COMPOUT2_A to COMPOUT2_A=L, if the output signal from the comparator section 20A is inverted as a result of comparison between the pixel signal and the ramp signal Ramp2; and causes a latch circuit 41-2 to latch a currently counted value of a counter 72. Thereby, digital data of the lower block is obtained.

Specifically, the logic circuit 30A includes an NAND gate 31A having one input terminal connected to the comparator 22A and the other input terminal for inputting the control signal φCK1_A; an NAND gate 32A having one input terminal connected to the comparator 22A via an NOT gate 37A, and the other input terminal for inputting the control signal φCK2_A; an R-S flipflop 33A connected between the NAND gate 31A and the latch circuit 41-1; and an R-S flipflop 34A connected between the NAND gate 32A and the latch circuit 41-2.

The latch section 40A includes the latch circuit 41-1 for latching digital data of the upper block of the A/D converted pixel signal, and the latch circuit 41-2 for latching digital data of the lower block of the A/D converted pixel signal. The latch circuit 41-1, 41-2 is constituted of a two bit latch circuit.

The switch section 50A includes a switch 51-1 connected between the horizontal signal line L1 and the latch section 40A, and connected to the latch circuit 41-1; a switch 61-1 connected between the switch 51-1 and the horizontal signal line L1; a switch 51-2 connected to the latch circuit 41-2; and a switch 61-2 connected between the switch 51-2 and the horizontal signal line L1.

The switch 51-1, 51-2 is turned on and off in accordance with the control signal φRD_A. The switch 61-1, 61-2 is turned on and off in accordance with a horizontal selecting signal to be outputted from the horizontal scanning circuit 4.

The column A/D converting element "B" is identical to the column A/D converting element "A" in the construction, and accordingly, detailed description of the column A/D converting element "B" is omitted herein. It should be noted that elements in the column A/D converting element "B" corresponding to those in the column A/D converting element "A" are described with the symbol "B", in place of the symbol "A".

Switches 52-1, 52-2, 62-1, and 62-2 in the column A/D converting element "B" respectively correspond to the switches 51-1, 51-2, 61-1, and 61-2 in the column A/D converting element "A".

Latch circuits 42-1 and 42-2 in the column A/D converting element "B" respectively correspond to the latch circuits 41-1 and 41-2 in the column A/D converting element "A".

The counter 71 is constituted of a two bit counter provided at the exterior of the column A/D converting elements "A" and "B". The counter 71 is operable to perform a counting operation for A/D conversion with respect to the upper block of the pixel signal, and output a counted value to the latch circuits 41-1 and 42-1.

Likewise, the counter 72 is constituted of a two bit counter provided at the exterior of the column A/D converting elements "A" and "B". The counter 72 is operable to perform a counting operation for A/D conversion with respect to the lower block of the pixel signal, and output a counted value to the latch circuits 41-2 and 42-2.

Figure 3:
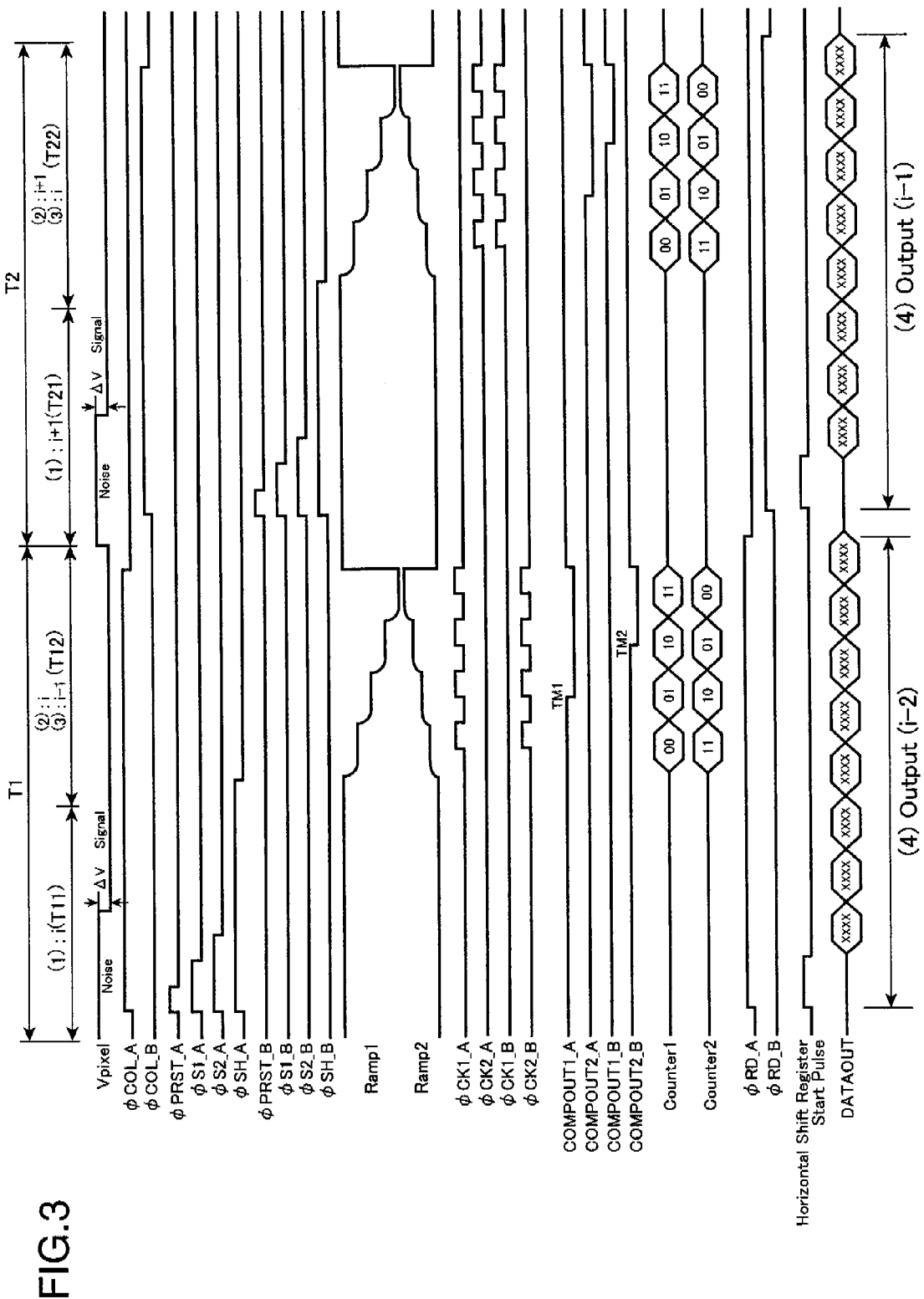
FIG. 3 is a timing chart of column A/D converting elements shown in FIG. 2.

FIG. 3 is a timing chart of the column A/D converting elements "A" and "B" shown in FIG. 2. In the timing chart shown in FIG. 3, a horizontal scanning period T1 for reading out a pixel signal at the i-th (i=1 through 8) row of the pixel array 1, and a horizontal scanning period T2 for reading out a pixel signal at the (i+1)-th row of the pixel array 1 are shown. The column A/D converting element "A" reads out the pixel signal at the i-th row from the pixel array 1 in the horizontal scanning period T1; and the column A/D converting element "B" reads out the pixel signal at the (i+1)-th row from the pixel array 1 in the horizontal scanning period T2. In the case where i=8, the (i+1)-row indicates the first row.

The horizontal scanning period T1 is divided into a period T11 and a period T12. In the period T11, the operation (1) of reading out the pixel signal at the i-th row from the pixel array 1 is performed.

Specifically, when the control signal φCOL_A=H (high level), the switch SW12A is turned on, the vertical signal line VL1 is connected to the GCA section 10A, a noise signal and a pixel signal are sequentially read out from the pixel array 1, and the GCA section 10A performs CDS, and the noise signal is removed from the pixel signal.

When the control signal φPRST_A=H or L, the switch SW11A is turned on or off, and the capacitor C2A is reset.

When the control signal φS1_A=H or L, and the control signal φS2_A=H or L, the switch SW23A and the switch SW24A are turned on or off, and the comparator section 20A is reset.

In the period T12, the operation (2) of performing A/D conversion with respect to the upper block of the pixel signal at the i-th row, and the operation (3) of performing A/D conversion with respect to the lower block of the pixel signal at the (i−1)-th row are concurrently performed. In the case where i=1, the (i−1)-th row indicates the eighth row. In the following, description is made based on the premise that the column A/D converting element "A" performs the operation (2), and the column A/D converting element "B" performs the operation (3).

In the period T12, when φSH_A=L (low level), the switch SW21A is turned off, and the pixel signal excluding the noise signal is sampled and held by the capacitor C3A.

When φSH_A=L, the controller 5 starts outputting the ramp signal Ramp1. Since the signal COMPOUT1_A=H at this time, the switch SW22A is in an ON-state, and the ramp signal Ramp1 is inputted to the comparator 21A via the switch SW22A. When φSH_A=L, the counter 71 starts a counting operation.

Then, the comparator 21A compares the level of the pixel signal with the level of the ramp signal Ramp1. If the level of the ramp signal Ramp1 is under the level of the pixel signal (at the timing TM1), the comparator 21A inverts the output signal. The output signal inverted by the comparator 21A is inputted to the logic circuit 30A via the capacitor C6A and the comparator 22A. Thereby, the signal COMPOUT1_A is set to COMPOUT1_A=L, the currently counted value "01" of the counter 71 is latched by the latch circuit 41-1, and the switch SW22A is turned off.

In the period T12, when φSH_A=L, the controller 5 starts outputting the ramp signal Ramp2. Then, the comparator 21B compares the level of the ramp signal Ramp2 with the level of the pixel signal held by the capacitor C3B, and if the level of the ramp signal Ramp2 is over the level of the pixel signal (at the timing TM2), the comparator 21B inverts the output signal. Thereby, the signal COMPOUT2_B is set to COMPOUT2_B=L, and the currently counted value "01" of the counter 72 is latched by the latch circuit 42-2. The counter 72 starts a counting operation from "11" in place of "00", because the level of the ramp signal Ramp2 increases as time elapses.

In the horizontal scanning period T1, the control signal φRD_A=H, and the switches 51-1 and 51-2 are in an ON state. Thereby, the operation (4) of outputting digital data of the pixel signal at the (i−2)-th row, which has been latched by the latch circuits 41-1 and 41-2 to the horizontal signal line L1; and the operations (1) through (3) are concurrently performed.

The horizontal scanning period T2 is divided into a period T21 and a period T22. In the period T21, the operation (1) of reading out the pixel signal at the (i+1)-th row from the pixel array 1 is performed. In the period T22, the operation (2) of performing A/D conversion with respect to the upper block of the pixel signal at the (i+1)-th row, and the operation (3) of performing A/D conversion with respect to the lower block of the pixel signal at the i-th row are concurrently performed. In the horizontal scanning period T2, the operation (4) of outputting digital data of the pixel signal at the (i−1)-th row from the latch circuits 42-1 and 42-2, and the operations (1) through (3) are concurrently performed.

Figure 4:
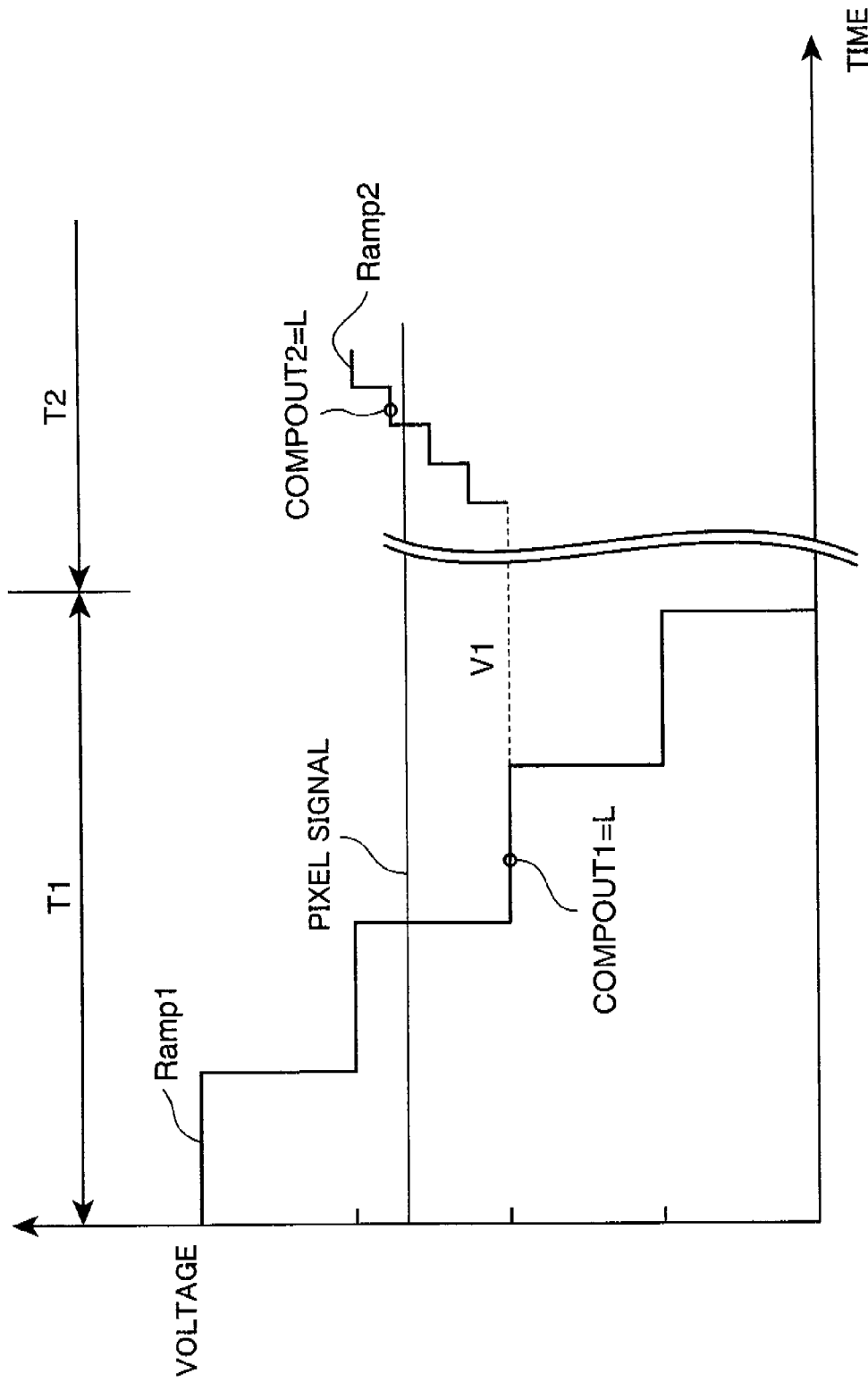
FIG. 4 is a graph for describing an operation to be performed by a comparator section shown in FIG. 2.

FIG. 4 is a graph for describing an operation to be performed by the comparator section 20A. Referring to FIG. 4, the vertical axis indicates a voltage, and the horizontal axis indicates a time.

In the horizontal scanning period T1, when φSH_A=L, the ramp signal Ramp1 is inputted to the comparator 21A. If the level of the ramp signal Ramp1 is under the level of the pixel signal held by the capacitor C3A, the comparator 21A inverts the output signal. Thereby, a signal COMPOUT1 is set to COMPOUT1=L, and the counted value of the counter 71 is latched by the latch circuit 41-1. A voltage V1 of the ramp signal Ramp1 at the time when the output signal from the comparator 21A is inverted is held by the capacitor C5A. Thereby, A/D conversion with respect to the upper block of the pixel signal at the i-th row is completed.

In the horizontal scanning period T2, when φSH_A=L, the ramp signal Ramp2 is inputted to the comparator 21A. If the level of the ramp signal Ramp2 is over the level of the pixel signal held by the capacitor C3A, the comparator 21A inverts the output signal. In this case, since the voltage V1 is held by the capacitor C5A, the initial voltage of the ramp signal Ramp2 is set to V1. Also, the voltage value of the ramp signal Ramp2 corresponding to one step is one-fourth of the voltage value of the ramp signal Ramp1 corresponding to one step, based on the capacitance ratio between the capacitors C4A and C5A. Accordingly, use of the ramp signal Ramp2 is advantageous in performing high-resolution A/D conversion with respect to a pixel signal with a less number of clocks.

Figure 5:
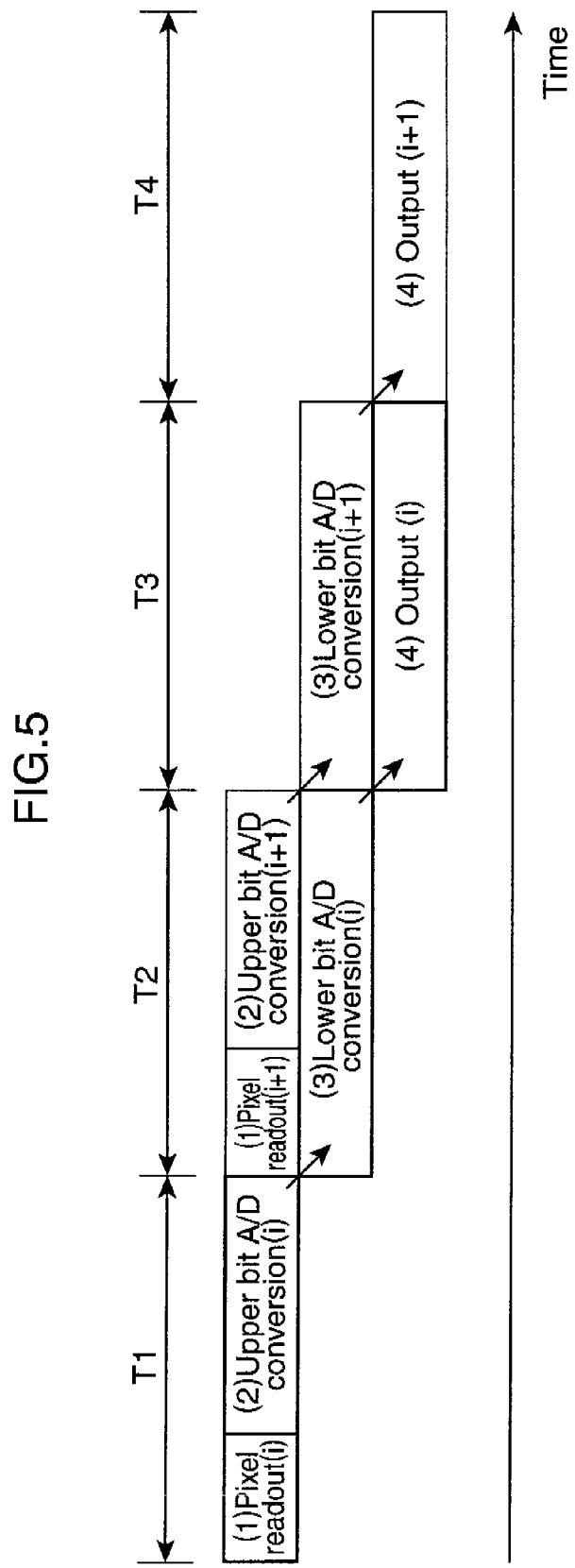
FIG. 5 is a sequence diagram of the column A/D converter shown in FIG. 2.

FIG. 5 is a sequence diagram of the column A/D converter 3 shown in FIG. 2. In the sequence diagram of FIG. 3, operations with respect to pixel signals corresponding to two rows i.e. the i-th row and the (i+1)-th row are illustrated. First, in a horizontal scanning period T1, the operation (1) is performed, wherein the pixel signal at the i-th row is read out by the column A/D converting element "A". In the horizontal scanning period T1, the operation (2) is performed following the operation (1), wherein the upper block of the pixel signal at the i-th row is subjected to A/D conversion by the column A/D converting element "A".

Then, in a horizontal scanning period T2, the lower block of the pixel signal at the i-th row is subjected to A/D conversion by the column A/D converting element "A". In the horizontal scanning period T2, the operations (1) and (2) are concurrently performed with the operation (3). Specifically, the pixel signal at the (i+1)-th row is read out by the column A/D converting element "B", and the upper block of the readout pixel signal at the (i+1)-th row is subjected to A/D conversion by the column A/D converting element "B".

Then, in a horizontal scanning period T3, the operation (4) of outputting digital data of the pixel signal at the i-th row from the latch circuits 41-1 and 41-2 is performed by the column A/D converting element "A". In the horizontal scanning period T3, the operation (3) of performing A/D conversion with respect to the lower block of the pixel signal at the (i+1)-th row is concurrently performed with the operation (4) by the column A/D converting element "B".

Then, in a horizontal scanning period T4, the operation (4) of outputting digital data of the pixel signal at the (i+1)-th row from the latch circuits 42-1 and 42-2 is performed by the column A/D converting element "B".

As described above, in the solid state image sensing device, the controller 5 causes each of the column A/D converting elements "A" and "B" to concurrently perform A/D conversion with respect to different blocks of pixel signals at different rows. Specifically, the controller 5 causes the column A/D converting element j (j=A, B) to read out the pixel signal at the i-th row, and then perform A/D conversion with respect to the upper block of the pixel signal at the i-th row in one horizontal scanning period.

Accordingly, in one horizontal scanning period, merely the operation (1) of reading out the pixel signal at the i-th row, and the operation (2) of performing A/D conversion with respect to the upper block of the pixel signal at the i-th row are performed, unlike the conventional arrangement, wherein an operation of reading out a pixel signal, an operation of performing A/D conversion with respect to an upper block of the readout pixel signal, and an operation of performing A/D conversion with respect to a lower block of the readout pixel signal are simultaneously performed. This enables to secure a certain time as a period for A/D conversion with respect to a pixel signal of an upper block. Thereby, high-precision A/D conversion can be performed with respect to the pixel signal of the upper block, and one horizontal scanning period can be reduced.

Second Embodiment

In this section, a solid state image sensing device in accordance with the second embodiment of the invention is described. The solid state image sensing device in accordance with the second embodiment has a feature that latch circuits 41-1 and 41-2, and a GCA section 10A are used in common between column A/D converting elements "A" and "B". Elements in the second embodiment substantially identical or equivalent to those in the first embodiment are indicated with the same reference numerals, and description thereof is omitted herein.

Figure 6:
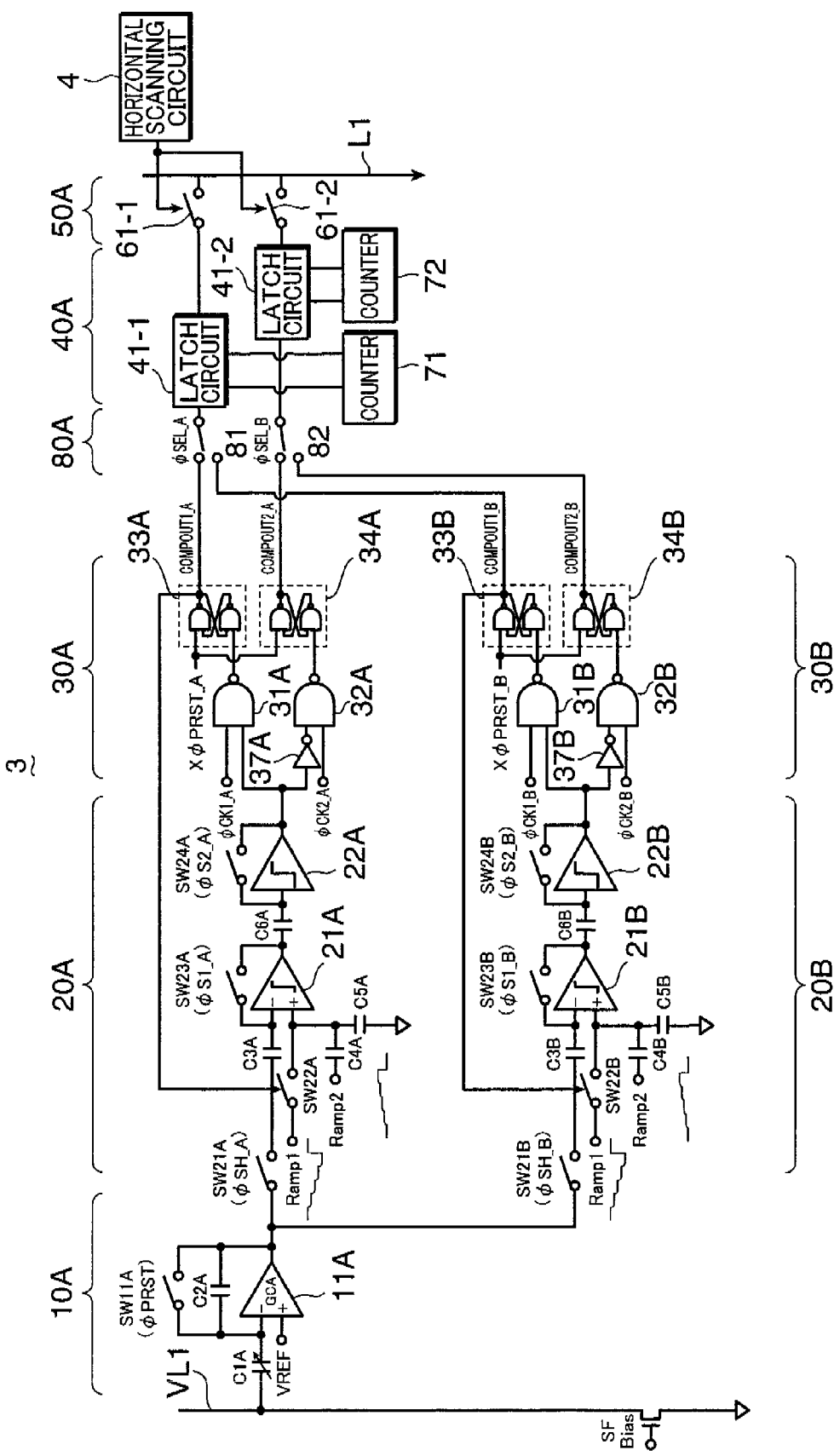
FIG. 6 is a circuit diagram of a column A/D converter in the second embodiment of the invention.

FIG. 6 is a circuit diagram of a column A/D converter 3 in the second embodiment of the invention. The GCA section 10A has an output portion connected to a comparator section 20A and a comparator section 20B, and is used in common between the column A/D converting elements "A" and "B".

A latch section 40A is connected to an output portion of a logic circuit 30A and an output portion of a logic circuit 30B via a switch section 80A, and is used in common between the column A/D converting elements "A" and "B".

In this embodiment, since the GCA section 10B shown in FIG. 2 is eliminated, the switch SW12A between the GCA section 10A and the vertical signal line VL1 is eliminated. Further, since the latch section 40B is eliminated, the switches 52-1, 52-2, 62-1, and 62-2 for selecting the latch section 40B are also eliminated. In this embodiment, a switch 81 is connected between the logic circuit 30A and the latch section 40A to select the logic circuit 30A, and a switch 82 is connected between the logic circuit 30B and the latch section 40A to select the logic circuit 30B.

The switch 81 selects between an R-S flipflop 33A and an R-S flipflop 33B. The switch 82 selects between an R-S flipflop 34A and an R-S flipflop 34B. In this arrangement, a latch circuit 41-1 is operable to latch digital data of an upper block of a pixel signal to be subjected to A/D conversion by the column A/D converting element "A" or the column A/D converting element "B"; and a latch circuit 41-2 is operable to latch digital data of a lower block of a pixel signal to be subjected to A/D conversion by the column A/D converting element "A" or the column A/D converting element "B".

Figure 7:
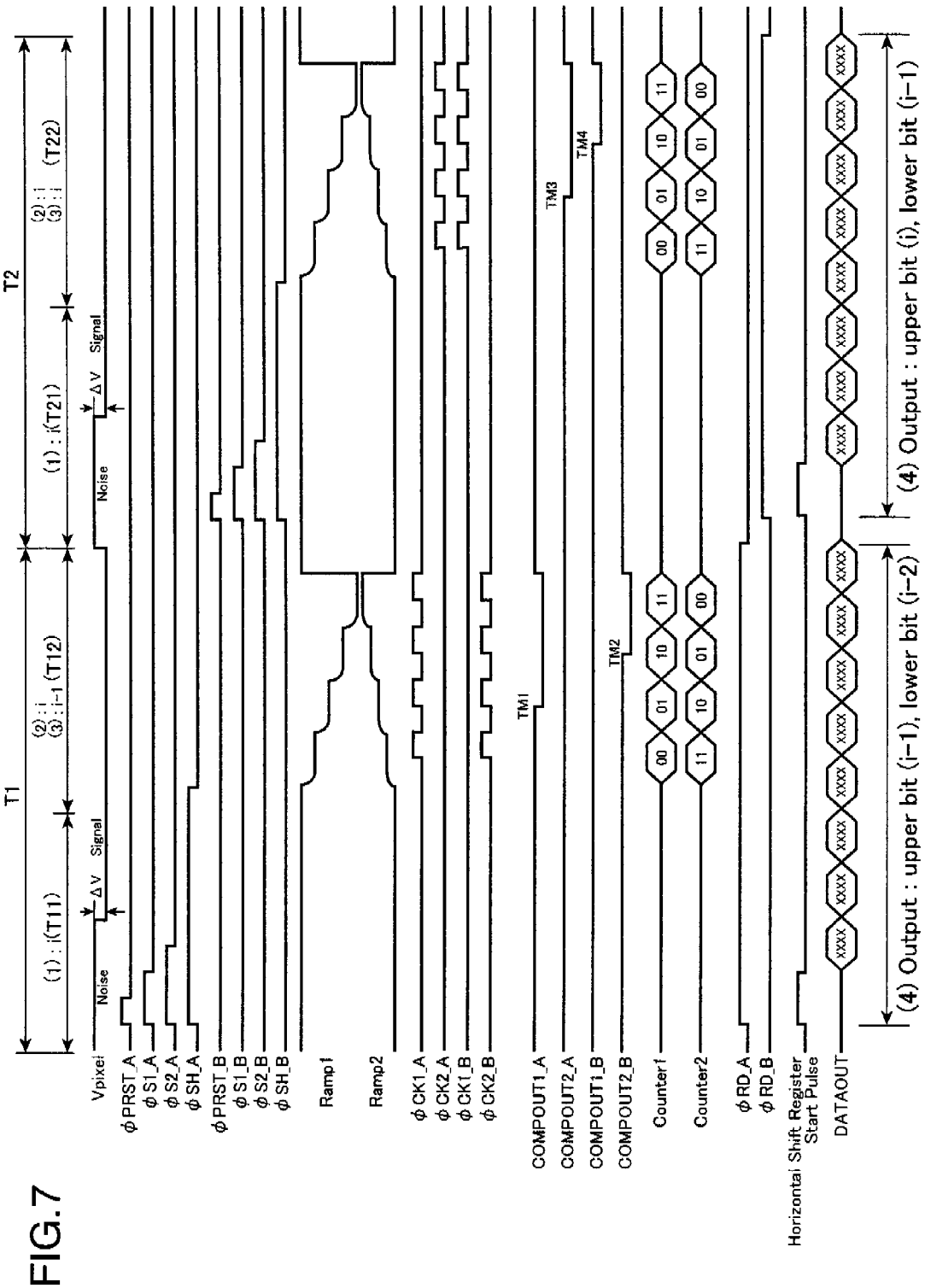
FIG. 7 is a timing chart of the column A/D converter shown in FIG. 6.

FIG. 7 is a timing chart of the column A/D converter 3 shown in FIG. 6. In a horizontal scanning period T1, when φSH_A=L, a pixel signal at the i-th row is sampled and held by a capacitor C3A.

In the horizontal scanning period T1, φSEL_A=H. Accordingly, a signal COMPOUT1_A is inputted to the switch 81, and the signal COMPOUT1_A is set to COMPOUT1_A=L (at the timing TM1). The latch circuit 41-1 latches a currently counted value of a counter 71.

In the horizontal scanning period T1, φSEL_B=L. Accordingly, a signal COMPOUT2_B is inputted to the switch 82, and the signal COMPOUT2_B is set to COMPOUT2_B=L (at the timing TM2). The latch circuit 41-2 latches a currently counted value of a counter 72.

In the above arrangement, the operation (2) of performing A/D conversion with respect to the upper block of the pixel signal at the i-th row, and the operation (3) of performing A/D conversion with respect to the lower block of the pixel signal at the (i−1)-th row are concurrently performed.

Then, in a horizontal scanning period T2, since φSH_B=L, a pixel signal at the (i+1)-th row is sampled and held by a capacitor C3B.

In the horizontal scanning period T2, φSEL_B=H. Accordingly, a signal COMPOUT2_A is inputted to the switch 82, and the signal COMPOUT2_A is set to COMPOUT2_A=L (at the timing TM3). The latch circuit 41-2 latches a currently counted value of the counter 72.

In the horizontal scanning period T2, φSEL_A=L. Accordingly, a signal COMPOUT1_B is inputted to the switch 81, and the signal COMPOUT1_B is set to COMPOUT1_B=L (at the timing TM4). The latch circuit 41-1 latches a currently counted value of the counter 71.

In the above arrangement, the operation (2) of performing A/D conversion with respect to the upper block of the pixel signal at the (i+1)-th row, and the operation (3) of performing A/D conversion with respect to the lower block of the pixel signal at the i-th row are concurrently performed.

In the solid state image sensing device in accordance with the second embodiment, since the latch section 40A is used in common, it is impossible to simultaneously latch the digital data of the upper block and the digital data of the lower block of the pixel signal at the i-th row by the latch circuit 41-1 and the latch circuit 41-2. Specifically, the digital data of the lower block of the pixel signal at the i-th row is outputted with a time lag corresponding to one horizontal scanning period with respect to the digital data of the upper block of the pixel signal at the i-th row. In view of this, an image processing section 6 holds the digital data of the upper block of the pixel signal at the i-th row for one horizontal scanning period to synchronously output the digital data of the lower block and the digital data of the upper block of the pixel signal at the i-th row.

In this way, in the solid state image sensing device in accordance with the second embodiment, since the GCA section 10A and the latch section 40A are used in common between the column A/D converting elements "A" and "B", the size of a circuit arrangement can be reduced.

In the first and the second embodiments, the upper block is constituted of two bit data, and the lower block is constituted of two bit data. Alternatively, a bit arrangement other than the above, wherein an upper block is constituted of four bit data, and a lower block is constituted of ten bit data, may be employed.

In the first and the second embodiments, a pixel signal is divided into two blocks i.e. the upper block and the lower block. Alternatively, a pixel signal may be divided into three or more blocks.

Figure 8:
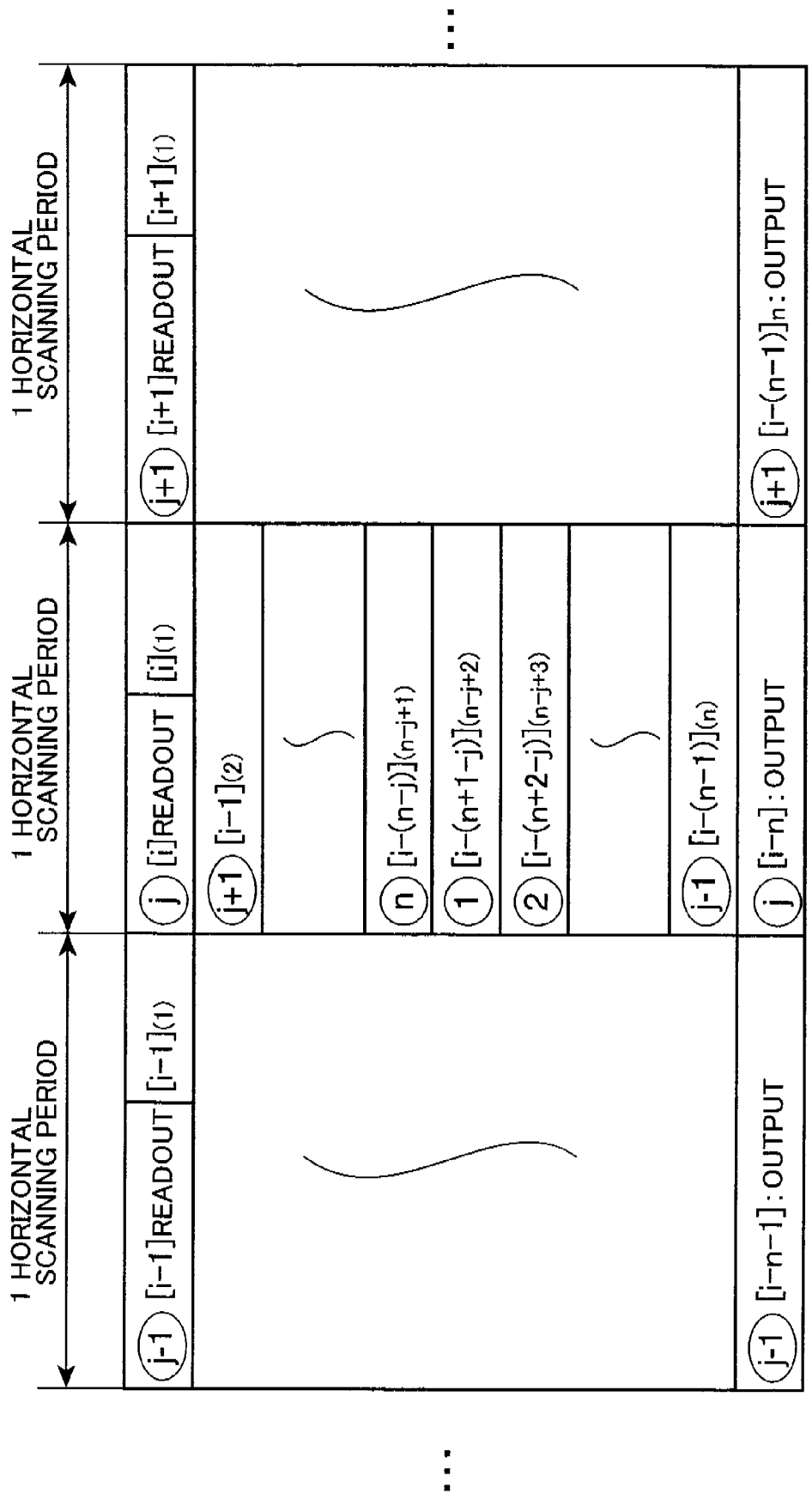
FIG. 8 is a sequence diagram in the case where a pixel signal is divided into first through n-th blocks.
Figure 9:
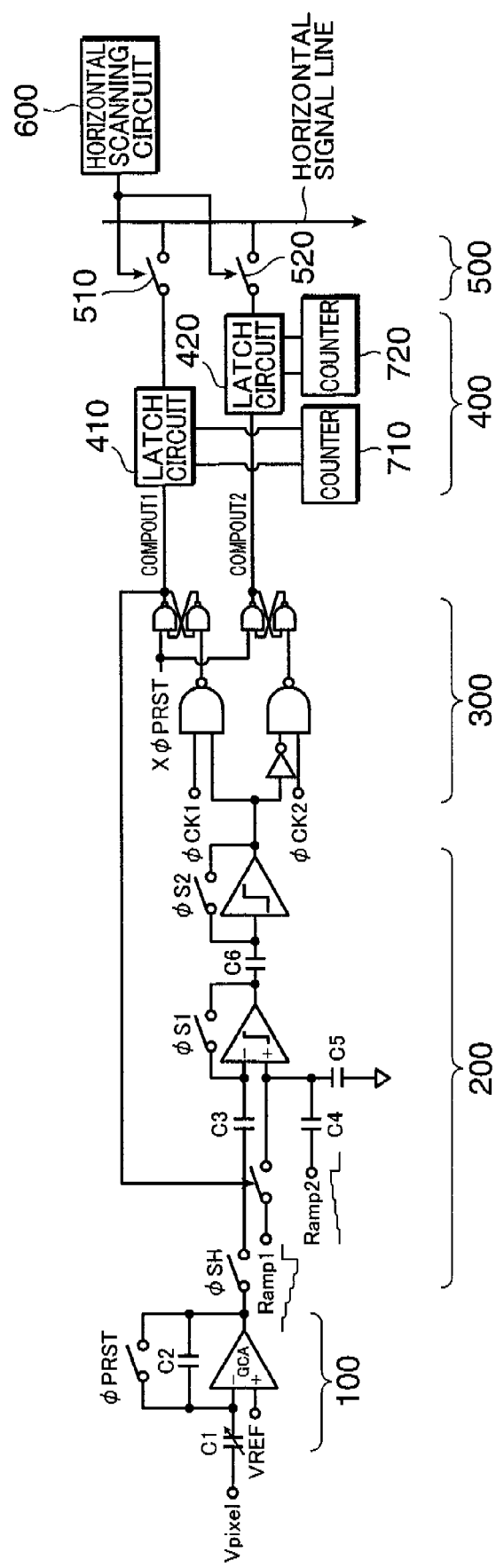
FIG. 9 is a circuit diagram of a column A/D converting circuit, corresponding to one column, to be used in the conventional solid state image sensing device.
Figure 10:
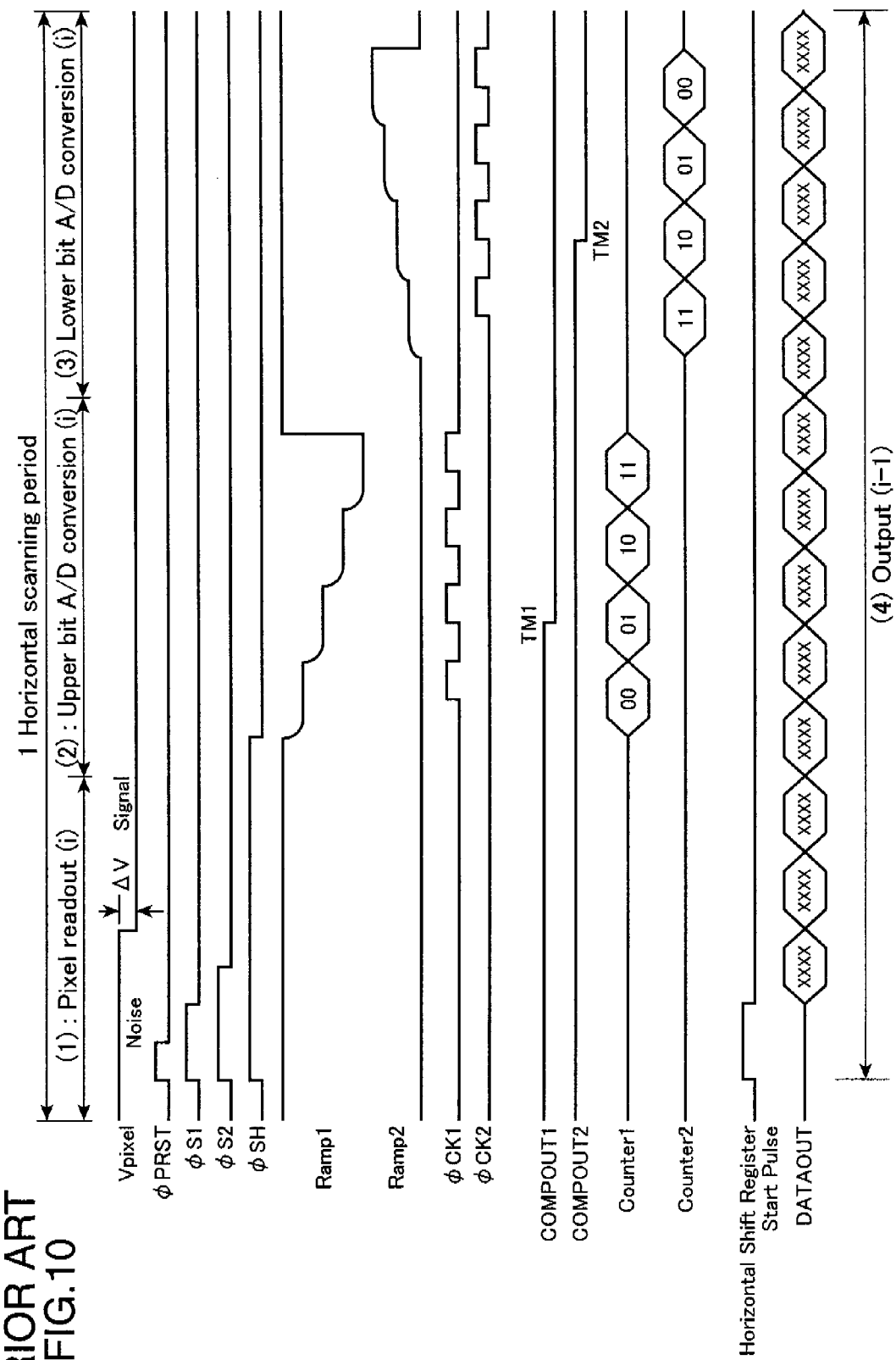
FIG. 10 is a timing chart of the column A/D converting circuit shown in FIG. 9.
Figure 11:
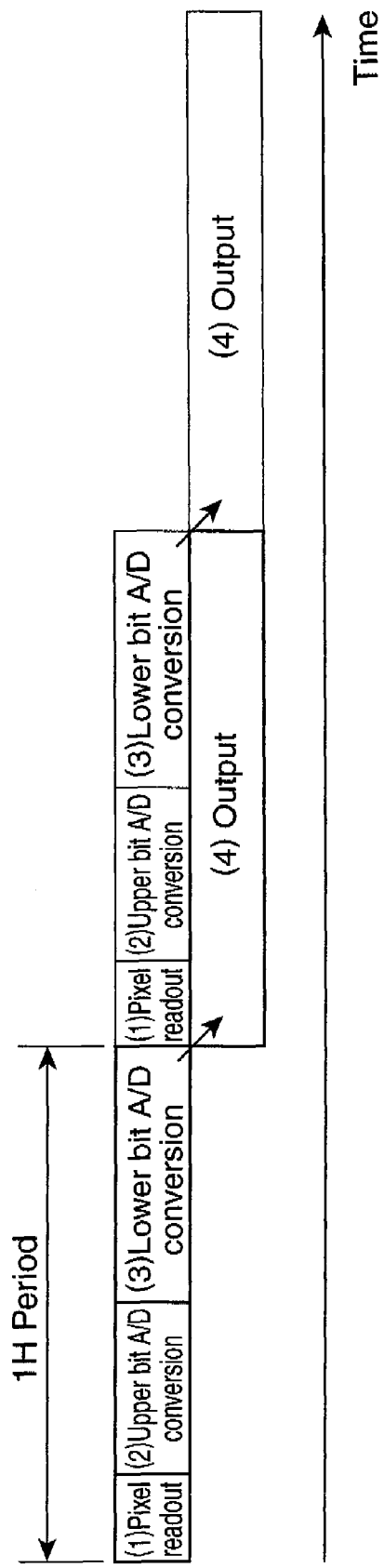
FIG. 11 is a sequence diagram on pixel signals at the i-th row and the (i+1)-th row to be processed by the A/D converting circuit shown in FIG. 9.

FIG. 8 is a sequence diagram, in the case where a pixel signal is divided into first through n-th blocks. Referring to FIG. 8, the indication in the bracket [ ] indicates the row number, the indication in the parenthesis ( ) or the subscript indicates the block number, and the indication enclosed by the circle indicates the element number of the column A/D converting element.

In the above modification, the following arrangement is employed. Specifically, a column A/D converter 3 is constituted of first through n-th column A/D converting elements. Each of the first through the n-th column A/D converting elements is operable to divide a pixel signal read out from a pixel array 1 into first through n-th blocks from an uppermost bit to a lowermost bit, and sequentially perform A/D conversion with respect to the blocks in the unit of one horizontal scanning period.

As shown in FIG. 8, a controller 5 concurrently performs an operation of causing the j-th column A/D converting element to read out a pixel signal at the i-th row, and then perform A/D conversion with respect to the first block of the pixel signal at the i-th row; an operation of causing the k-th (k=j+1 through n) column A/D converting element to perform A/D conversion with respect to the (k−j+1)-th block of the pixel signal at the (i−(k−j))-th row, and causing the k-th (k=1 through j−1) column A/D converting element to perform A/D conversion with respect to the (n+k−j+1)-th block of the pixel signal at the (i−(n+k−j))-th row; and an operation of causing the j-th column A/D converting element to output digital data of the pixel signal at the (i−n)-th row in one horizontal scanning period.

In the first and the second embodiments, the column A/D converter 3 is constituted of a double integral A/D converting circuit. Alternatively, an A/D converting circuit other than the double integral A/D converting circuit may be used. In the modification, it is preferable to use a sequential comparison A/D converting circuit to perform A/D conversion with respect to an upper block, and use an integral A/D converting circuit to perform A/D conversion with respect to a lower block.

The following is a summary on technical features of the solid state image sensing device.

(1) A solid state image sensing device according to an aspect of the invention includes: a pixel array constituted of pixels arranged in a matrix of a predetermined number of rows and a predetermined number of columns; a vertical scanning circuit for cyclically selecting a row out of the rows of the pixel array; column A/D converters provided in correspondence to the columns of the pixel array, and for reading out a pixel signal of the row selected by the vertical scanning circuit for A/D conversion, each of the column A/D converters including first through n-th column A/D converting elements, where n is an integer of 2 or more; and a controller for controlling the pixel array, the vertical scanning circuit, and the first through the n-th column A/D converting elements to cause each of the first through the n-th column A/D converting elements to divide the pixel signal read out from the pixel array into first through n-th blocks from an uppermost bit to a lowermost bit, and sequentially perform A/D conversion with respect to the blocks in the unit of one horizontal scanning period in such a manner that concurrent A/D conversion with respect to different blocks of pixel signals at different rows is performed.

In the above arrangement, each of the first through the n-th column A/D converting elements is operable to divide the pixel signal into the first through the n-th blocks from the uppermost bit to the lowermost bit, and sequentially perform A/D conversion with respect to the blocks of the pixel signal in the unit of one horizontal scanning period.

In the above arrangement, the controller causes each of the first through the n-th column A/D converting elements to concurrently perform A/D conversion with respect to different blocks of pixel signals at different rows.

Accordingly, pixel signals of the first through the n-th blocks are subjected to A/D conversion in a pipeline manner, thereby enabling to perform A/D conversion with respect to pixel signals of one row per horizontal scanning period.

The above arrangement enables to reduce one horizontal scanning period, thereby performing high-precision A/D conversion at a high-speed frame rate.

(2) Preferably, the controller may cause the j-th (j=1 through n) column A/D converting element in each of the column A/D converters to read out the pixel signal at the i-th row, and then perform A/D conversion with respect to the first block of the pixel signal at the i-th row in the one horizontal scanning period.

In the above arrangement, the controller causes the j-th (j=1 through n) column A/D converting element to read out the pixel signal at the i-th row, and then perform A/D conversion with respect to the first block of the pixel signal at the i-th row in the one horizontal scanning period.

Accordingly, in one horizontal scanning period, 3merely the operation of reading out the pixel signal at the i-th row, and the operation of performing A/D conversion with respect to the first block of the pixel signal at the i-th row are performed, unlike the conventional arrangement, wherein an operation of reading out a pixel signal, an operation of performing A/D conversion with respect to upper two bits of the readout pixel signal, and an operation of performing A/D conversion with respect to lower two bits of the readout pixel signal are simultaneously performed. This enables to secure a certain time as a period for A/D conversion with respect to the first block of the pixel signal. Thereby, high-precision A/D conversion can be performed with respect to the first block of the pixel signal, and one horizontal scanning period can be reduced.

(3) Preferably, the controller may cause the j-th column A/D converting element in each of the column A/D converters to read out the pixel signal at the i-th row, and simultaneously output A/D converted digital data of the first through the n-th blocks of the pixel signal read out at the (i−n) row.

In the above arrangement, the A/D converted digital data of one row can be outputted in the unit of one horizontal scanning period.

(4) Preferably, each of the column A/D converting elements may be an integral A/D converting circuit.

In the above arrangement, since each of the column A/D converting elements is constituted of an integral A/D converting circuit, high-precision A/D conversion can be performed.

(5) Preferably, the first through the n-th column A/D converting elements may include a latch section for latching A/D converted digital data, and a switch section connected between the latch section, and a horizontal signal line for transmitting the digital data latched by the latch section. The latch section has a given number (n) of latch circuits for latching the digital data of the first through the n-th blocks, and the switch section has switches corresponding to the first through the n-th blocks.

In the above arrangement, the switch section is operable to sequentially output the digital data of the first through the n-th blocks from the latch section to the horizontal signal line.

(6) Preferably, the column A/D converter may include a latch section for latching the A/D converted pixel signal, and the latch section may have a given number (n) of latch circuits used in common between the first through the n-th column A/D converting elements, and for latching digital data of the first through the n-th blocks.

In the above arrangement, since the given number (n) of the latch circuits corresponding to the first through the n-th blocks can be used in common between the first through the n-th column A/D converting elements, the size of a circuit arrangement can be reduced.

(7) Preferably, each of the column A/D converting elements may include a comparator provided anterior to the latch section, and a switch section for connecting one of the comparators in the column A/D converting elements with one of the given number (n) of the latch circuits.

In the above arrangement, since the switch section is provided between the comparator and the latch circuit, digital data of the corresponding block can be latched by the latch circuit, even in the case where the latch circuit is used in common between the first through the n-th column A/D converting elements.

(8) Preferably, the first through the n-th column A/D converting elements may use a single GCA section in common.

In the above arrangement, since the one GCA section can be used in common between the first through the n-th column A/D converting elements, the size of a circuit arrangement can be reduced.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A solid state image sensing device, comprising:
    a pixel array constituted of pixels arranged in a matrix of a predetermined number of rows and a predetermined number of columns;
    a vertical scanning circuit for cyclically selecting a row out of the rows of the pixel array;
    column A/D converters provided in correspondence to the columns of the pixel array, and for reading out a pixel signal of the row selected by the vertical scanning circuit for A/D conversion, each of the column A/D converters including first through n-th column A/D converting elements, where n is an integer of 2 or more; and
    a controller for controlling the pixel array, the vertical scanning circuit, and the first through the n-th column A/D converting elements to cause each of the first through the n-th column A/D converting elements to divide the pixel signal read out from the pixel array into first through n-th blocks from an uppermost bit to a lowermost bit, and sequentially perform A/D conversion with respect to the blocks in the unit of one horizontal scanning period in such a manner that concurrent A/D conversion with respect to different blocks of pixel signals at different rows is performed.

2. The solid state image sensing device according to claim 1, wherein
    the controller causes the j-th (j=1 through n) column A/D converting element in each of the column A/D converters to read out the pixel signal at the i-th row, and then perform A/D conversion with respect to the first block of the pixel signal at the i-th row in the one horizontal scanning period.

3. The solid state image sensing device according to claim 2, wherein
    the controller causes the j-th column A/D converting element in each of the column A/D converters to read out the pixel signal at the i-th row, and simultaneously output A/D converted digital data of the first through the n-th blocks of the pixel signal read out at the (i−n) row.

4. The solid state image sensing device according to claim 1, wherein
    each of the column A/D converting elements is an integral A/D converting circuit.

5. The solid state image sensing device according to claim 4, wherein
    the first through the n-th column A/D converting elements include
        a latch section for latching A/D converted digital data, and
        a switch section connected between the latch section, and a horizontal signal line for transmitting the digital data latched by the latch section,
    the latch section has a given number (n) of latch circuits for latching the digital data of the first through the n-th blocks, and
    the switch section has switches corresponding to the first through the n-th blocks.

6. The solid state image sensing device according to claim 4, wherein
    the column A/D converter includes a latch section for latching the A/D converted pixel signal, and
    the latch section has a given number (n) of latch circuits used in common between the first through the n-th column A/D converting elements, and for latching digital data of the first through the n-th blocks.

7. The solid state image sensing device according to claim 6, wherein
    each of the column A/D converting elements includes
        a comparator provided anterior to the latch section, and
        a switch section for connecting one of the comparators in the column A/D converting elements with one of the given number (n) of the latch circuits.

8. The solid state image sensing device according to claim 1, wherein
    the first through the n-th column A/D converting elements use a single GCA section in common.

* * * * *